United States Patent [19]

Misker et al.

[11] Patent Number: 4,464,733

[45] Date of Patent: Aug. 7, 1984

[54] OFFICE SYSTEM COMPRISING TERMINALS, A DATA PROCESSOR AND AUXILIARY APPARATUS AND A SWITCHING DEVICE FOR MASS DATA TRANSPORT BETWEEN THE AUXILIARY APPARATUS

[75] Inventors: Jan S. Misker; Jacobus A. de Vos, both of Eindhoven, Netherlands

[73] Assignee: U.S. Philips Corporation, New York, N.Y.

[21] Appl. No.: 323,620

[22] Filed: Nov. 20, 1981

[30] Foreign Application Priority Data

Jul. 23, 1981 [NL] Netherlands .................... 8103477

[51] Int. Cl.³ .................... G06F 15/16; G06F 15/20; G06F 3/00; G06F 9/00
[52] U.S. Cl. .................... 364/900; 235/379; 235/454
[58] Field of Search ... 364/200 MS File, 900 MS File; 235/379, 454

[56] References Cited

U.S. PATENT DOCUMENTS

| 4,028,733 | 6/1977 | Ulicki ................................ 360/10 |
| 4,201,978 | 5/1980 | Nally ............................... 340/146.3 |
| 4,205,780 | 6/1980 | Burns et al. ........................ 235/454 |
| 4,264,808 | 4/1981 | Owens et al. ...................... 235/379 |
| 4,404,649 | 9/1983 | Nunley et al. ..................... 364/900 |

*Primary Examiner*—James D. Thomas
*Assistant Examiner*—Archie E. Williams, Jr.
*Attorney, Agent, or Firm*—Jack E. Haken; James J. Cannon, Jr.

[57] ABSTRACT

A document and image processing system, used for the updating of document-wise organized information an office system, has a number of auxiliary apparatus for recording, filing and outputting of such information. Also present are a processor with terminals, peripheral apparatus and a data bus. For the fast execution of mass data transport between the auxiliary apparatus there is provided a switching device which has a number of parallel data highways. Each auxiliary apparatus is connected to the switching module by means of its own switching module in order to be interconnected to either the data bus or, via one of the data highways, to another auxiliary apparatus.

4 Claims, 9 Drawing Figures

OFFICE SYSTEM COMPRISING TERMINALS, A DATA PROCESSOR AND AUXILIARY APPARATUS AND A SWITCHING DEVICE FOR MASS DATA TRANSPORT BETWEEN THE AUXILIARY APPARATUS

BACKGROUND OF THE INVENTION

1. Field of the Invention

The invention relates to an office system for the processing of a data file by means of at least two simultaneously operational terminals, common processor means, a first number of peripheral apparatus, and a data bus which interconnects the processor means, the terminals and peripheral apparatus.

2. Description of the Prior Art

A terminal station customarily comprises a keyboard for the input of alphanumeric data and control signals, a display device for the display of such alphanumeric data, for example, 25 lines of 40 characters each and possibly further elements such as a foreground memory, a (small) processor and an output apparatus such as a daisy wheel printer. The peripheral apparatus may be inter alia one or more background memories such as a magnetic disc memory, or a highspeed. Systems of this kind are customarily used and offer good results for the processing and filing of text matter consisting of alphanumeric characters which are organized in lines and have fixed shapes. The characters may be matrix characters having a standard dimension of $7 \times 9$ dots. The set of characters may also be extended with so-called graphic characters so that the text can be elucidated with figures to a given extent.

The work in an office environment involves large quantities of documents. Prior to the input of the data into the memory of the office system, the documents can be converted into series of character codes by means of a character recognition machine. Such OCR machines, however, are expensive and susceptible to errors. Moreover, any documents contain material which cannot be alphanumerically classified, such as figures, signatures, and annotations in the margin. Therefore, it is an object of the invention to enable input of the documents into the system in complete form and without conversion into character codes, the mass data transport then required between a document reader, a memory device and a display device being fast, while bypassing the processor means and hence without prolonged occupation of the latter, so that the processor means require only a limited processing capacity and the office system can still be used simultaneously by different terminals. The object in accordance with the invention is achieved in that for the updating of a document file and the mass data transport between a second number of auxiliary apparatus, that is to say at least:

a. a document reader with pixel-wise scanning of a document field according to a scan pattern;

b. a read/write memory for the reversible storage of the total pixel information of said document field in accordance with said scan pattern;

c. a display device for the display of the total pixel information of said document field;

d. a memory device comprising a digital video disc with optical write and read means for the filing of the total pixel information of said document field; there is provided a switching device which comprises:

A. for each of said auxiliary apparatus a switching module which has a first connection for the associated auxiliary apparatus, a second connection to said data bus, a third connection and a control connection, the first and the second connection being transparently interconnected in a first state of the switching module, while the first and the third connection are interconnected in a second state of the switching module;

B. at least one first and one second internal data highway whereto all said third connections are coupled;

C. a control member which includes a first control line which is connected to the data bus in order to receive control and selection signals and to despatch reply signals and which also has associated control outputs which are connected to the control connections of associated switching modules in order to carry a selection signal for activating said first or said second state, as desired, and in order to form in said second state, two coexistent pairs from four of said second number of auxiliary apparatus, said pairs being interconnected via said first and said second internal data highway, respectively, said control member furthermore having a signalling input for receiving a termination signal after termination of a mass data transport and for releasing the relevant data highway in reaction thereto;

D. a data flow control element for realizing a mass data transport of the pixel information of a document field in said second state of the switching module, synchronized in a handshake by synchronization signals which are also carried on the internal data highway. In the switching device an attractive separation is thus realized between on the one hand the mass data transport between the various auxiliary apparatus and on the other hand the adaptation of the switching device to the auxiliary apparatus. Furthermore, each of the auxiliary apparatus is connected via a respective separate switching module to either the data bus and hence to processor/terminals or to the internal data highway. As a result, the construction of the switching modules remains simple, without giving rise to congestion at the level of these switching modules; such congestion is removed, if necessary, at the level of the data bus, for example, by an arbitrating processor or a distributed arbitration mechanism. Furthermore, the processor need not continuously monitor the mass data transport between the auxiliary apparatus, so that a comparatively simple processor suffice. The switching device may also have a modular construction, which implies that it can be readily extended, both as regards the number of switching modules/auxiliary apparatus as well as regards the number of internal data highways within the switching device. "Transparent" is to be understood to mean herein that the organization is such that any buffering within the switching module has a depth of at the most one elementary data group (e.g. bit or byte).

When use is made of a third number of n internal data highways, the third connection in each switching module preferably has n lines, each of which is coupled to a relevant internal data highway, each switching module preferably having n second states for performing a 1-out-of-n selection from said n lines. The internal data highway itself may thus have a very simple construction and the selection function is present within the switching module. The mass data transport can then be monitored and synchronized by the auxiliary apparatus themselves. Thus, an auxiliary station itself can interrupt or terminate the mass data transport, if desired.

Preferably, for the memory device comprising a digital video disc there is provided a storage device having k separate storage positions and a common loading position for the memory device and the storage device, there being provided a selection/transport device for transporting a selectable video disc between the associated storage position and the loading position, said storage device having a second control member which is connected to said data bus as a further peripheral apparatus. The mechanical organization of a memory device comprising a plurality of video discs is described in the previous U.S. patent application Ser. No. 298,843, filed Sept. 3, 1981 and assigned to the assignee of the present application, which is incorporated herein by way of reference. When the control member thereof is constructed as a peripheral apparatus of the data bus/processor means, an attractive separation is made between the electromechanical selection of the amount of data to be transported and the actual mass data transport; during the electromechanical selection only a limited number of instructions must be transported; this can be readily realized via the data bus. It has also been found that an attractive modular construction of the memory device comprising video discs can thus be realized. After all, the electromechanical selection and presentation of a video disc from a storage position is very slow in comparison with the electronic/electromechanical selection of a data block on a video disc; this consideration also favors the construction of the control member as a peripheral apparatus.

BRIEF DESCRIPTION OF THE FIGURES

The invention will be described in detail with reference to some figures.

DESCRIPTION OF THE PREFERRED EMBODIMENTS

General Configuration

Figure 1:
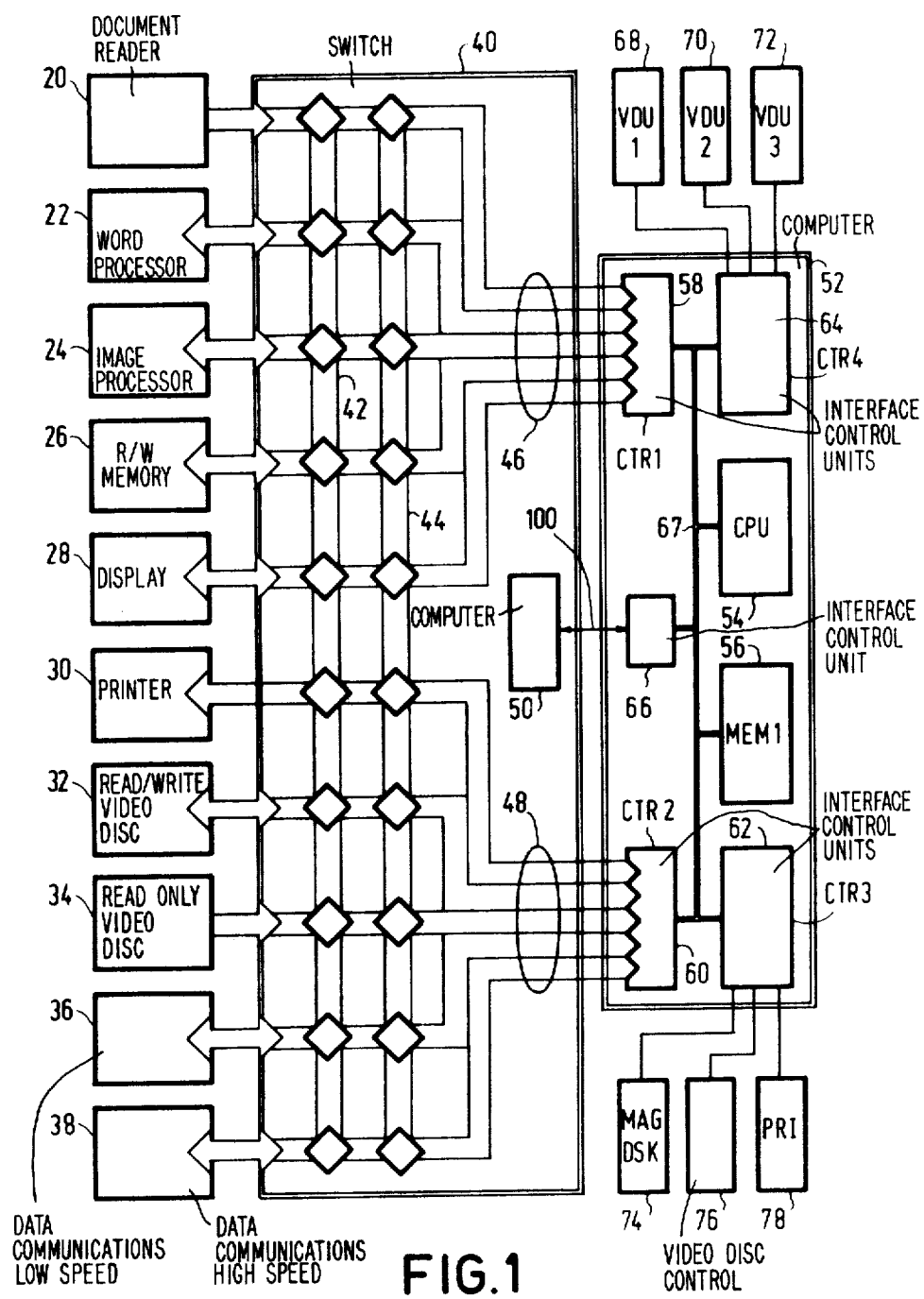
FIG. 1 shows a block diagram of a configuration of an office system.

FIG. 1 shows, by way of example, a block diagram of a configuration of an office system. The central data processing device is formed by a computer 52. The computer in this embodiment is a commercially available minicomputer, make N. V. Philips' Gloeilampenfabrieken, Eindhoven, the Netherlands, type P857. Minicomputers of another make can also be used, but will not be described herein for the sake of brevity. The computer comprises control (interface) units for peripheral apparatus 58, 60, 62, 64, a central processor unit 54, a general processing memory 56, a general purpose data bus 67 which interconnects these parts, and a further interface unit for a peripheral apparatus 66. The interface units are shown as a block; said minicomputer actually comprises connection facilities for peripheral apparatus, each connection comprising its own channel interface unit. The interface unit 64 serves, for example, three terminals 68, 70, 72 which are of a customary type, as has already been stated. The interface unit 62 serves a number of first peripheral apparatus 74, 76, 78. Block 74 is a conventional magnetic disc memory for the storage of program data, intermediate data and user data. Block 76 represents a control device for a memory device comprising a number of video discs. In the rest position, the video discs are arranged in a corresponding number of storage positions, for example, as parallel discs with coincident axes. A number of storage positions can be combined to form a storage module. There are also one or more operational positions. The discs can be selected by a gripping mechanism and be moved to a loading position. The video disc can be moved from the loading position to the operational position by a second gripping mechanism. In some cases there may be a plurality of storage modules. They are then coupled in that they have a transfer position in common. The path from the storage position to the operational position then extends first via one or more transfer positions and subsequently via the loading position. At the area of the operational position there is arranged a read means, for example, in the form of a laser element which scans the surface of the rotating video disc. A write means in the form of a laser element may also be present. The path up to the loading position forms part of the peripheral apparatus 76 and the remainder forms part of the auxiliary apparatus 32/34 as will be explained hereinafter.

Block 78 represents a further conventional peripheral apparatus, for example, a fast printer comprising a rotating drum. The computer, the work stations and the peripheral apparatus 74, 78 are known per se; they do not form part of the idea of the invention, but are merely linked therein for efficient mass data transport. This will be described in detail hereinafter.

At the other side of the figure the block diagram comprises a second number of auxiliary apparatus which are in principle suitable notably for the processing of data which is related to a document field, inter alia by way of mass data transport between the various auxiliary apparatus.

Among the auxiliary apparatus (blocks 20 to 38), block 20 represents a document reader. A document having the standard format DIN A4 (21.0×29.7 cm) is scanned therein in lines, and the scanning data is converted into a series of black/white indicating bits. For customary text configurations, for example, 7.7 lines per millimeter in height are used and 8 dots per millimeter of scanning line. A document field having the standard A4 format then supplies a quantity of data of approximately 4M bits. Thus, a document having an arbitrary data content (text, binary or binarized figures) can be converted into bit series for input into the office system. For scanning there is provided a known one-dimensional or two-dimensional matrix of photodiodes, together with a shift register for the parallel/series conversion (for example, comprising charge-coupled cells). The mechanical aspects of this and other auxiliary apparatus will not be elaborated herein, because only the data transport between the auxiliary apparatus and the data bus 67 is considered to be of relevance.

Block 22 represents a word processor of a customary type whereby text can be generated and updated for output. The work processor may comprise a character organized printer. The alphanumeric texts and further control signals can be locally generated.

Block 24 represents an image processor which serves to reduce the redundancy in an image. Customary black/white configurations such as obtained from the document reader 20 contain a substantial redundancy. The redundancy can be reduced by means of a given, known code. The image processor can reduce the redundancy by coding and can reconstruct the complete 1:1 image by decoding. The less-redundant image can then be stored (block 32).

Block 26 represents a read/write memory which is capable of storing the complete data of a document field (for example, an A4 document scanned by the document reader 20) or of a complete image of the image processor 24. It is constructed as a conventional random access memory and has a capacity of 4M bits. Addressing is performed by means of an address counter which is incremented each time by the transport of an elementary amount of data. In order to reach a very high transport speed on the data bus, such an elementary data amount may comprise more than 8 bits, which are then buffered. Between the relevant buffer and the output there is provided a converter between said elementary amount and the byte-serial transport.

Block 28 represents a display device, for example, comprising a cathode ray tube and an associated read/write memory for one page. The cathode ray tube and the read/write memory are adopted to the definition with which the document field is scanned by the document reader. It is not necessary to display the document with the original format; a given enlargement/reduction is permissible. The number of pixels per scanning line and the number of lines per image, however, remain the same. Except for the large number of pixels per image, this is a conventional video display device.

Block 30 represents a printing unit for the formation of a hard copy on paper or a similar material. This copy contains the complete information obtained (in block 20) from the document field scanned, or originating from the image processor 24, the memory 26 or the word processor 22 (if the latter can be switched over from the alphanumeric to the graphic mode, for example, a processed image can be provided with an additional text). The printing unit may be a customary facsimile printer which utilizes, for example, an electrostatic printing element. Block 32 represents a memory device comprising a video disc with optical write and read means for the filing of the total pixel-wise information of a document field. The video disc is driven at a uniform speed and modifications can be introduced into its surface by means of, for example, an optical laser in order to store a bit pattern. These modifications can also be detected by means of a laser. Such a device comprises an interface unit to the environment and a number of further elements which will be described with reference to FIG. 8.

Block 34 corresponds to block 32, be it that this memory device is suitable only for the reading of data.

Block 36 is an interface unit for a low-speed data connection to the environment, for example, by acoustic coupling to a telephone line: these lines have a transmission capacity of a few kilobauds. Block 36 then comprises a parallel/series converter, because the data connection is generally serial. The transport from/to the environment generally takes place via the memory 26. Because there are several internal data highways, the entire switching device will not be blocked during the execution of such a necessarily slow mass data transport.

Block 38 is an interface unit for a high-speed data line to the environment, which has a capacity of, for example, 48 kbauds. Otherwise the same is applicable as for block 36.

Each of the auxiliary apparatus 20 to 38 is connected to the switching device 40 by way of an individual connection. For some of these connections the data traffic is in only one direction, and for others in both directions, as indicated by the arrows. Control signals are always transported in both directions. In practice, the auxiliary apparatus can be exchanged and all connections to the switching device are identical (bidirectional data transport possible). In another configuration, a different number of auxiliary apparatus may be present. They may all be present at the same location (office), but they may also be functionally coupled to one or more of the terminals 68, 70, 72 and be located together therewith at a separate location. Such a combination is referred to as a work station. The switching device 40 (see hereinafter) still establishes the connections between the auxiliary stations. This embodiment includes a centralized computer 52. The work stations may alternatively have a distributed arithmetic capacity, so that a computer network is concerned. The assignment of the data bus can then be realized, for example, by means of a distributed arbitration mechanism. The data bus then directly connects the terminals, peripheral apparatus and switching device.

All auxiliary apparatus are directly connected, via the switching device 40, to their own connection in the computer (blocks 58 and 60). Furthermore, the switching device comprises a number of internal data highways, only two of which (42, 44) are shown for the sake of simplicity. At the crossings of the internal data highways and the connections to the auxiliary stations 20 to 38, a rhombic figure is shown. This figure symbolizes an organization where a switch which is capable of separating and interconnecting two crossing connections is quasi present. Thus, in this embodiment each time a pair can be formed for realizing a mass data transport between two pairs of auxiliary apparatus by way of a relevant internal data highway. The transport may be, for example, from the document reader 20 to the display device 28 and from the read/write memory 26 to the video disc memory device 32. In the case of a larger number of internal data highways, of course, more pairs of auxiliary apparatus can be simultaneously formed. Finally the switching device 40 comprises a micro-computer 50 which exchanges control signals with the interface unit 66 of the computer 52. The micro-computer controls and realizes the data exchange inter alia by establishing and interrupting the connections between pairs of auxiliary stations via the internal data highways of the switching device.

Detailed Description of the Switching Device

Figure 2:
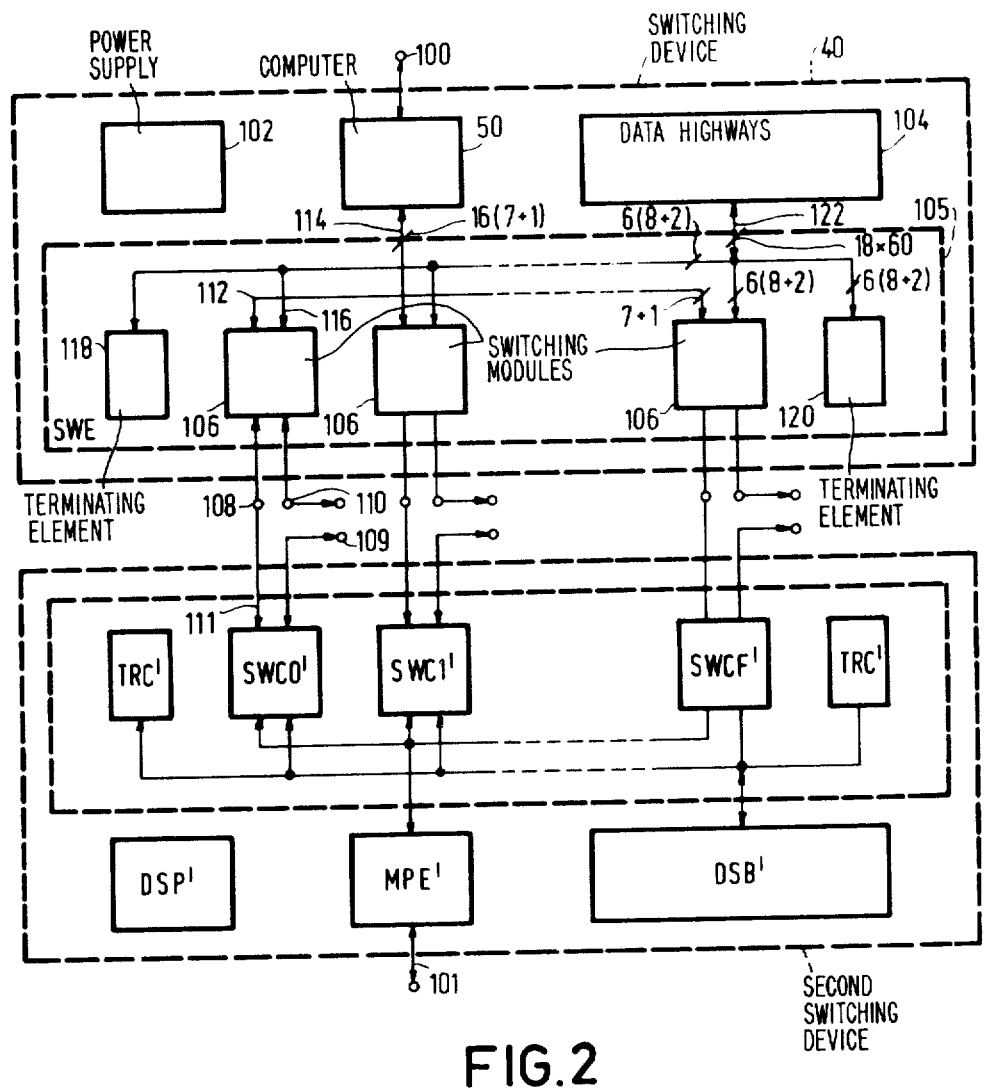
FIG. 2 shows a block diagram of a switching device.
Figure 9:
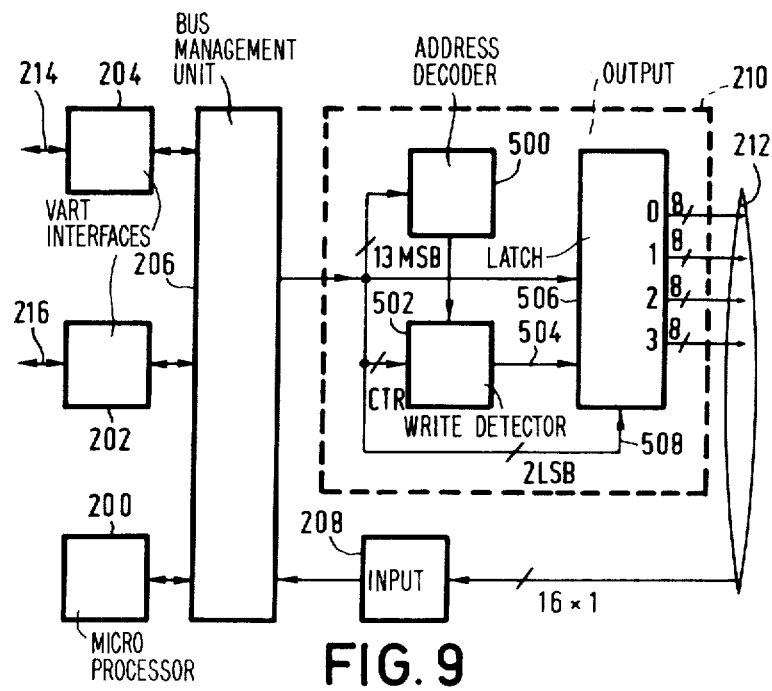
FIG. 9 shows a block diagram of the control member of the switching device.

FIG. 2 shows a block diagram of the switching device. The microcomputer 50 comprises a connection 100 to the computer 52. An interface protocol V24 according to the CCITT standard is defined on this connection. This is a bit serial operation. A further, similar possibility is the IEEE protocol EIA.RS.232.C described in John Conway, "Serial I/O thrusts Indecomp into Asynchronous Communications", Electronic Design News, Aug. 20, 1978, pages 89-96. In the described office system the former protocol has been selected as the standard for communication between the computer 52 and the microcomputer 50, and also between the computer 52 and peripheral apparatus 74, 76, 78 and terminals 68, 70, 71. The microcomputer is constructed in accordance with the block diagram shown in FIG. 9 which will first be described. The figure comprises the following parts:

(a) a microprocessor 200 of the type Signetics 2650, incorporating (on a printed circuit board) 4k ROM bytes of control memory and 2k RAM bytes for work results, and also a unit for controlling the traffic on the bus 206 (bus management unit);

(b) two interface units 202, 204 for implementation of said V24 protocol on the lines 214 and 216, respectively. These units together form the line 100 of FIG. 1. The two interface units are connected in parallel. The reason for the use of these units is that in given circumstances said V24 protocol decrees a wait operation until a reply signal has been received, for example from an auxiliary apparatus. If such a signal is not received, the transport of control signals would be blocked for that duration. One of the two interface units is then set to the waiting position; the other one can still remain available for transmitting a control signal. Each of the interface units is composed of a module Signetics 2651 UART (universal asynchronous receiver transmitter) complemented by line drive elements (drivers) and line receivers according to the V24 specification;

(c) a microprocessor bus which is symbolized by the block 206; this bus is only a number of unidirectional or bidirectional connection lines; the connections to the further modules are provided with arrows indicating the directions of the data flows;

(d) an input unit 208 for addressing each auxiliary apparatus as a memory location for the microprocessor (memory mapped input). For each auxiliary apparatus there is provided a signalling input having a width of one bit. In the elaborated embodiment, at the most 16 auxiliary apparatus can be connected, so that line 212 is connected to the unit 208 via 16 one-bit lines. Thus, when the relevant switching module is in the second state, each auxiliary apparatus can signal that a mass data transport continues or not (signal $\overline{ACT}$ in FIG. 4). The input unit comprises a detector for detecting the generating of one of the (sixteen) addresses for an auxiliary apparatus on the bus 206 by the microprocessor 200. It is subsequently activated to despatch a selected reply signal to the microprocessor;

(e) an output unit 210 for addressing each auxiliary apparatus as a memory location for the microprocessor (memory mapped output). For the sake of clarity, this module is shown in a more elaborate form than the block 208. The memory mapped output organization enables the use of instructions with indexed addresses. The address decoder 500 receives the 13 most-significant address bits and compares these bits with a predetermined memory mapped output module address. Element 502 detects a memory write instruction and produces an enable signal on the line 504 in that case. Block element 506 comprises a latch circuit having a width of 32 bits of the type HEF 4724, make N. V. Philips' Gloeilampenfabrieken, Eindhoven, the Netherlands. The latch circuit is activated by the signal on the line 504. The output of the block element 506 has a width of $4 \times 8$ bits. The two least-significant address bits on the line 508 each time select one of the four outputs having a width of 8 bits. Actually, each time the eighth control bits of these outputs is not used. For each auxiliary apparatus there is provided a control output, so that the module 210 shown is present four times. The hexadecimal addresses of the auxiliary apparatus run from "7000" to "700F", the total width of the addresses amounting to 15 bits. Except for the direction of transport of the signals and the width of the control signal path, the input unit 208 and the output unit 210 have a similar operation. Line 212 corresponds to the line 114 in FIG. 2.

Referring to FIG. 2 again, the switching device also comprises a power supply apparatus 102 (only symbolically shown) and the actual internal data highways 104 whose cabling is symbolized by block 105 which contains the switching electronics. For each of the maximum number of 16 auxiliary apparatus 108 to be connected there is provided a switching module 106 (SWCO . . . SWCF). In the present embodiment all switching modules are assumed to be identical, but they need not be identical. The line 108 of the switching module SWCO is intended for connection to the associated auxiliary apparatus and the line 110 is intended for connection to the computer 52. Each of these lines has a width of 15 bits, that is to say 8 data bits and 7 control bits. Furthermore, the switching module SWCO is connected to the microcomputer 50. To this end, the line 112 has a width of 8 bits, as will be explained hereinafter. The combination of 16 times the line 112 corresponds to the line 114. All switching modules SWCO . . . SWCF are controlled parallel-wise by the microcomputer, and the line 114 thus has a width of $16 \times (7+1) = 128$ bits. All switching modules SWCO . . . F are also connected to all internal data highways (block 104) (in FIG. 1 only two highways are shown). Each internal data highway has a width of 10 bits, that is to say 8 data bits and two bits for realizing a synchronization handshake. In this embodiment, there are six internal data highways and a selection therefrom is always made in the switching module. To this end, the line 116 has a width of $6 \times 10 = 60$ bits. All switching modules are connected in parallel to the internal data highways. Also connected thereto are two terminating elements 118, 120 in order to form the terminating impedances of the internal data highways: this implies each time a line having a width of $6 \times 10$ bits. The line 122 thus has an overall width of $18 \times 60 = 1080$ bits.

The communication on the lines 108 etc. takes place via a byte-serial protocol. The procedure is as follows. If no mass data transport is necessary between the auxiliary apparatus, the lines corresponding to 108 and 110 are interconnected in each switching module. The auxiliary apparatus (20 to 38 in FIG. 1) then operate as if they were peripheral apparatus of the computer such as the peripheral apparatus 74, 78. Actually, the difference between peripheral apparatus and auxiliary apparatus is mainly an organizational difference in that only the auxiliary apparatus are directly connected to the internal data highways of the switching device. On the other hand, a given technical realization of an apparatus can be used as an auxiliary apparatus as well as be connected as a peripheral apparatus. However, the computer 52 can supply such a signal on the line 100 that the control of the byte-serial protocol on the line 108 (or a corresponding line in another switching module) is taken over by the microcomputer 50 (by way of the line 112). In view of the width of the internal data highways in the block 104, mass data transports can be simultaneously realized between six pairs of auxiliary apparatus (SWCO . . . SWCF). In as far as is permitted by the nature of the auxiliary apparatus, the data transport can be realized in both directions. The microcomputer 50 also receives the status signals of the switching electronics in the block 105, so that also the progress of (any) mass data transport is known. If necessary, these status signals are applied to the computer 52.

The termination elements 118, 120 comprise two resistors for each bit line. Via resistor of 220 Ohms, the bit line is connected to a potential of +5 volts and to ground potential via a resistor of 330 ohms. Thus, only little reflections occur at the physical ends of the internal data highways.

In given cases the number of internal data highways in the switching device (DAS) 40 is not sufficient. FIG. 2 shows a solution for increasing this number by utilizing a second switching device DAS' which comprises the same components as the switching device DAS, be it that these components are denoted by a prime. The corresponding switching modules are interconnected: the connection 108, originally intended for the auxiliary apparatus, is connected to connection 111 of the switching module SWCO' which was originally intended for connection to the computer. On the other hand, the connection 110 remains reserved for the computer. The second connection 109 of the switching module SWCO' is now reserved for the peripheral apparatus. The control connection 101 of the switching electronics MPE' is connected to the data line, together with the control connection 100. The connections 108 and 111 thus are dissimilar. However, it is alternatively possible for the connections 109 and 110 to be interconnected so that the connections 108 and 111 remain available for connection to the peripheral apparatus and the computer, respectively. If two (or more) switching devices are present, the connection pattern between the switching modules need not always be the same; for example, the switching module SWCO can be connected directly to the computer and the switching module SWC1 directly to a peripheral apparatus. Given pairs of switching modules may also remain non-interconnected; the number of feasible connection directions for an auxiliary apparatus can thus be restricted. All switching devices used need not necessarily have the same number of internal data highways.

The number of auxiliary apparatus to be connected can also be increased by interconnection of the internal data highways thereof (block 104).

Detailed Description of a Switching Module

Figure 3:
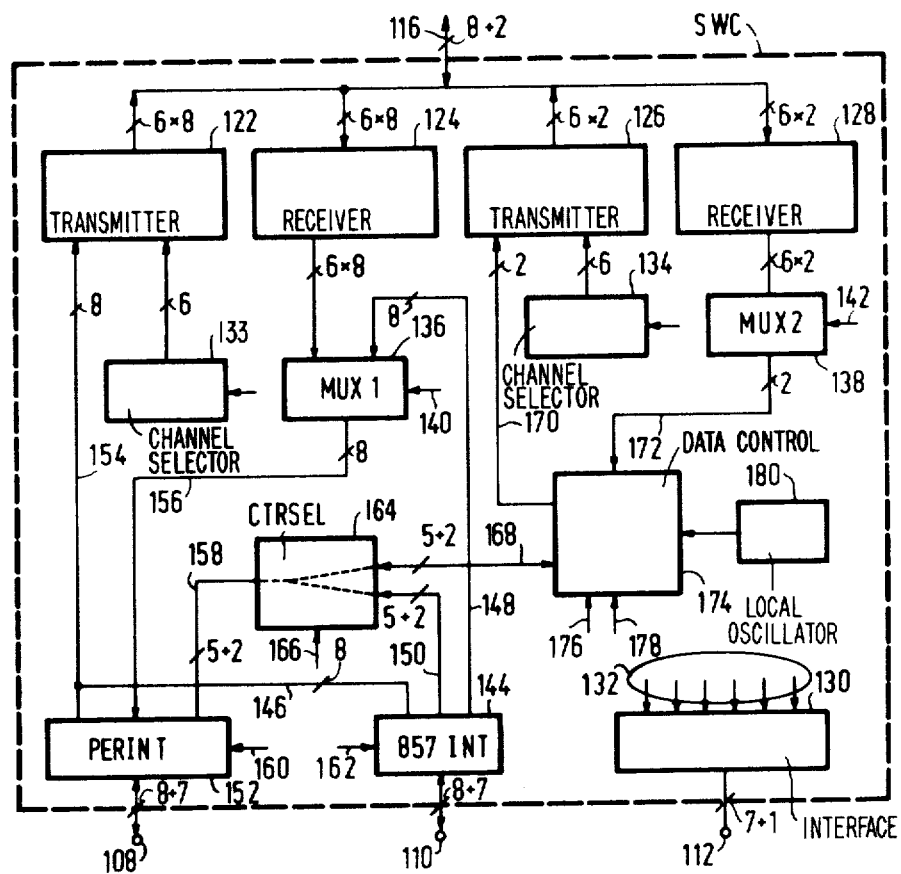
FIG. 3 shows a block diagram of a switching module in the switching device.

FIG. 3 shows a block diagram of one of the identical switching modules SWC (O . . . F) in the switching device. The control connection 112 to the microcomputer 50 has a width of 7+1 bits. For this purpose there is provided the interface circuit 130 which exchanges secondary control signals with the other parts of the switching module (lines 132); this interface circuit consists of buffer circuits of the type HEF 40097, make N. V. Philips' Gloeilampenfabrieken, Eindhoven, the Netherlands.

The switching module SWC is furthermore connected to the bidirectional data bus 116 by way of four connection elements which are unidirectionally active. First of all there are provided the receiver 124 for byte-serial data (having a width of 8 bits) and the transmitter 122 for byte-serial data. Also present are the transmitter 126 and the receiver 128 for control signals. The transmitters 122, 126 are activated by channel selectors 133, 134 which open up one of the internal data highways by means of a six-bit signal. Such a six bit signal has at the most a single "1" bit which unblocks the AND-gate which is provided per bit line for the relevant assigned internal data highway. The zeroes of this six bit signal have a blocking effect. In the transmission condition, both channel selectors 133, 134 activate; in the receive condition, only the channel selector 134 activates. On the control input which is denoted by an arrow, the channel selectors receive, for example, a three-bit signal which indicates the internal data highway by decoding; this three-bit signal is supplied by the block element 130.

The receivers 124, 128 conduct their input signals which are received in six-fold on 6×8 and 6×2 lines, respectively. Element 136 is a eight-fold 7-to-1 multiplexer which conducts at the most one of the received signals having a width of one byte. The control signal is supplied by the block element 130. Similarly, element 138 is a double 6-to-1 multiplexer with a control signal on the input 142.

The adaptation of the switching module to the computer 52 is realized by means of an interface element 144. Between the interior of the switching module and the interface element there are provided two unidirectionally active 8-bit data lines 146, 148 and one bidirectional control line 150 (5 bits in the one, 2 bits in the other direction). Line 148 is connected to the multiplexer 136.

The adaptation of the switching module to the auxiliary apparatus to be connected (line 108) is realized via the interface element 152. Two unidirectional 8-bit data lines 146/154 and 156 and one control line 158 are connected between the interface element and the interior of the switching module, said lines being organized in the same manner as the line 150. Lines 146/154 are connected to the transmitter 122 as well as to the interface unit 144. Line 156 originates from multiplexer 140. The interface elements 144, 152 also receive control signals from the block element 130 on the relevant inputs 162, 160.

Element 164 is a control selector with two positions which are selected by a signal on input 166 from block element 130. Control line 158 can thus be selectively coupled to either the line 150 which is coupled to the interface unit 144 or to the control line 168. The control line 168 (width 7 bits) is coupled, together with the 2-bit control lines 170, 172, to the data flow control element 174. In order to supply the latter element with clock pulses, there is provided the local oscillator 180. The data flow control element 174 exchanges control signals with the block element 130 via lines 176/178 as will be explained hereinafter.

The switching module SWC has two clearly distinct modes of operation. In the first mode, the control selector 164 is in the lower position, so that the switching module between the 7 control-bit lines of the lines 108 and 110 is transparent. The data transmission takes place in the one direction directly from the interface unit 152 to the interface unit 144, and in the other direction via the line 148, the multiplexer 136, and the line 156. The switching module is thus also transparent for the data lines. In the second mode a data transport is performed, notably a mass data transport, via one of the internal data highways which are symbolized by the block 104 (FIG. 2); the control thereof bypasses the computer 52, because the control selector 164 is in the upper position;

control is now effected by means of the data flow control element 174 via the lines 168 and 170 and 172, respectively. The data transport then takes place in one direction via the line 154, and via the multiplexer 136 and the line 156 in the other direction. A two-wire handshake is then realized on the internal data highway via the lines 170 and 172.

Figure 4:
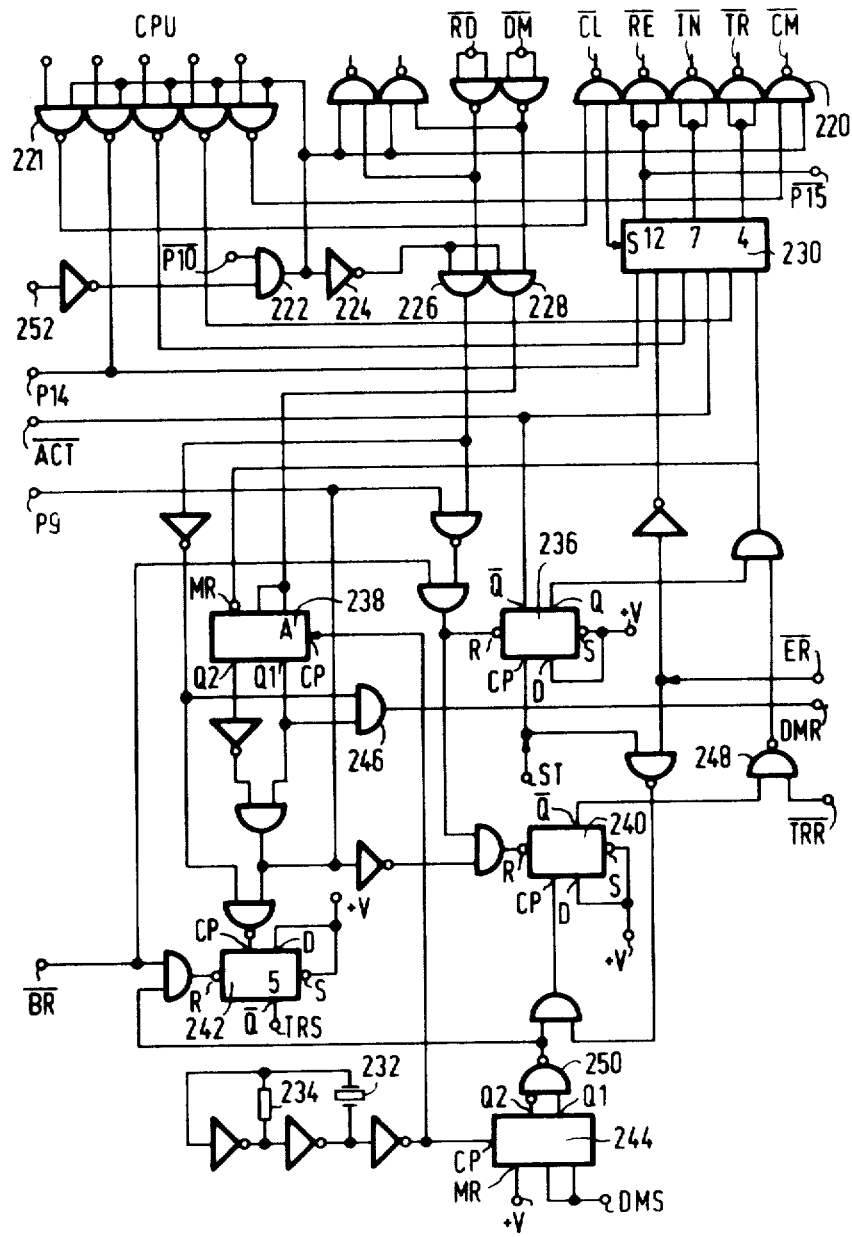
FIG. 4 shows a detailed diagram of a part of a switching module which concerns the control signals.

FIG. 4 shows elaboration of a detail of the switching module, notably the part which represents the interaction between the data flow control element 174, the control selector 164 and the control sections of the interface elements 144 and 152. At the top right there is shown the control section of the interface element 152 for the auxiliary apparatus (line 108 in FIG. 3). The gates, in the output direction, such as the gate 220, are of the make Texas Instruments, type 74 LS 38: open collector drive elements. The input gates (for example, gate 221) are also of the same Texas Instruments, type 74132. At the top left of the figure there is shown the control section of the interface element 144 for the computer (line 110). In the remainder of the circuit the elements which are shown as NAND-gates are of the type 74 LS 00. The signal indications have the following meaning:

$\overline{CM}$ signals, together with $\overline{TR}$, the presence of a control signal (instruction) from the computer for the auxiliary apparatus;

$\overline{TR}$ signals the presence of a byte (instruction or noninstruction) for the auxiliary apparatus, or requests the auxiliary apparatus to produce a data byte (auxiliary apparatus acts as receiver and transmitter, respectively);

$\overline{IN}$ signals the presence of a block of control bytes or data bytes for the relevant peripheral apparatus;

$\overline{DM}$ acts as a reply to the signal $\overline{TR}$, this signalling that the auxiliary apparatus has received a byte or has prepared a byte for transmission, respectively;

$\overline{RD}$ controls the termination of a mass data transport, initiated by the auxiliary apparatus; a stroke in the figure indicates that the inverted values of all these signals are used. The further elements used have been selected mainly from the 74 . . . series of integrated circuits of Texas Instruments. AND-gate 222 of the type 74 LS 08 controls the operating mode (control selector 164 in FIG. 3). If this gate outputs a "0", the data control element 174 controls a mass data transport via one of the internal data highways of the switching device; the signals $\overline{CM}$ and $\overline{CL}$ are then blocked. A logic "1" of the gate 222 connects the auxiliary apparatus to the computer. In the latter case, the output signal of the inverter 224 (type 74 LS 04) blocks the gates 226, 228. The signals $\overline{CL}$, $\overline{CM}$ are not used for the execution of a mass data transport; then they are blocked. The signals $\overline{DM}$ and $\overline{RD}$ are not applied to the computer in the case of a mass data transport; in the other case, the gates 226, 228 are blocked. The signals $\overline{RE}$, $\overline{IN}$, $\overline{TR}$ are applied to the selector switch 230 of the control selector 164 (type 74157).

The remainder of FIG. 4 comprises the local oscillator (180 in FIG. 3) with a 20 MHz crystal 232 which constitutes a fed-back resonant circuit in conjunction with a resistor 234 (120 ohms) and some inverters. Also present are a number of gates and sequentially operating logic elements for establishing the correct time relationships between the various signals. Element 236 is a clocked set/reset (RS) flipflop of the type 74 LS 74 which continuously receives a signal $+V$ on its data input. The inverted output carries a signal $\overline{ACT}$ which is applied to the microcomputer (line 112 in FIG. 3) and to the selector switch 230. The non-inverted output is connected, via an AND-gate, to the selector switch 230 and to the shift register 238. The clock pulse input receives the signal ST from the microcomputer. The reset input receives the signal $\overline{BR}$ from the microcomputer via an AND-gate, or the simultaneous occurrence of the signals $\overline{DM}$ and $\overline{RD}$ of the auxiliary apparatus.

Element 238 is a shift register of the type 74 LS 164 which can receive the signal DM on its data inputs. The MR (reset) input is connected parallel to the selector switch 230 in as far as the input for the signal TR for the auxiliary station is concerned. The shift register is clocked by the local oscillator. Via AND-gate 246, the signal DMR which will be described hereinafter is formed. Furthermore, a logic function of the output signals Q1, Q2 is applied to the elements 240, 242.

The element 240 corresponds to the element 236. The inverted output thereof is combined in the NAND-gate 248 with the signal $\overline{TRR}$ which is produced by the handshake on the internal data highway of the switching device.

The element 242 corresponds to the element 240. The output signal TRS forms the other synchronization signal of the two-wire handshake on the internal data highway of the switching device.

Figure 5:
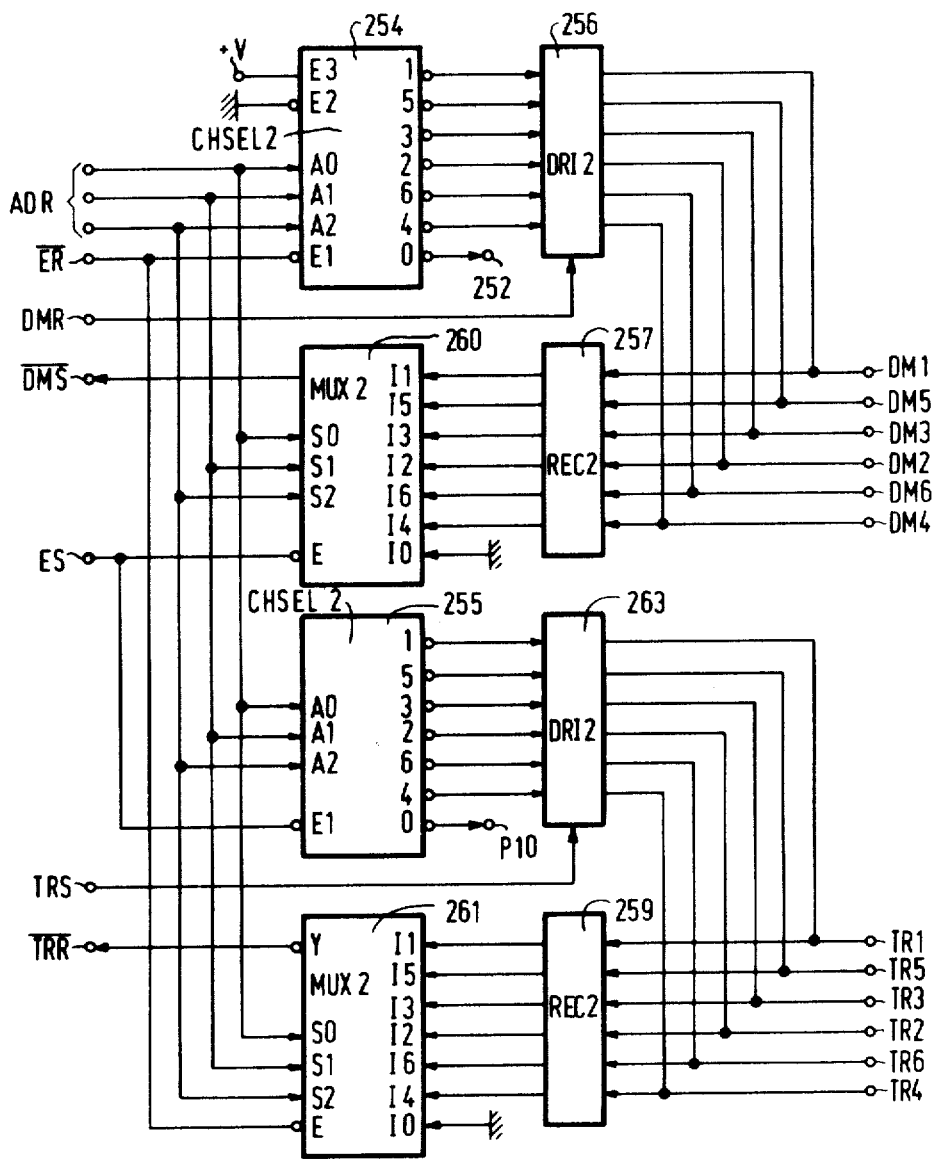
FIG. 5 shows a detailed diagram of a second part of the switching module which concerns the synchronization signals.
Figure 6:
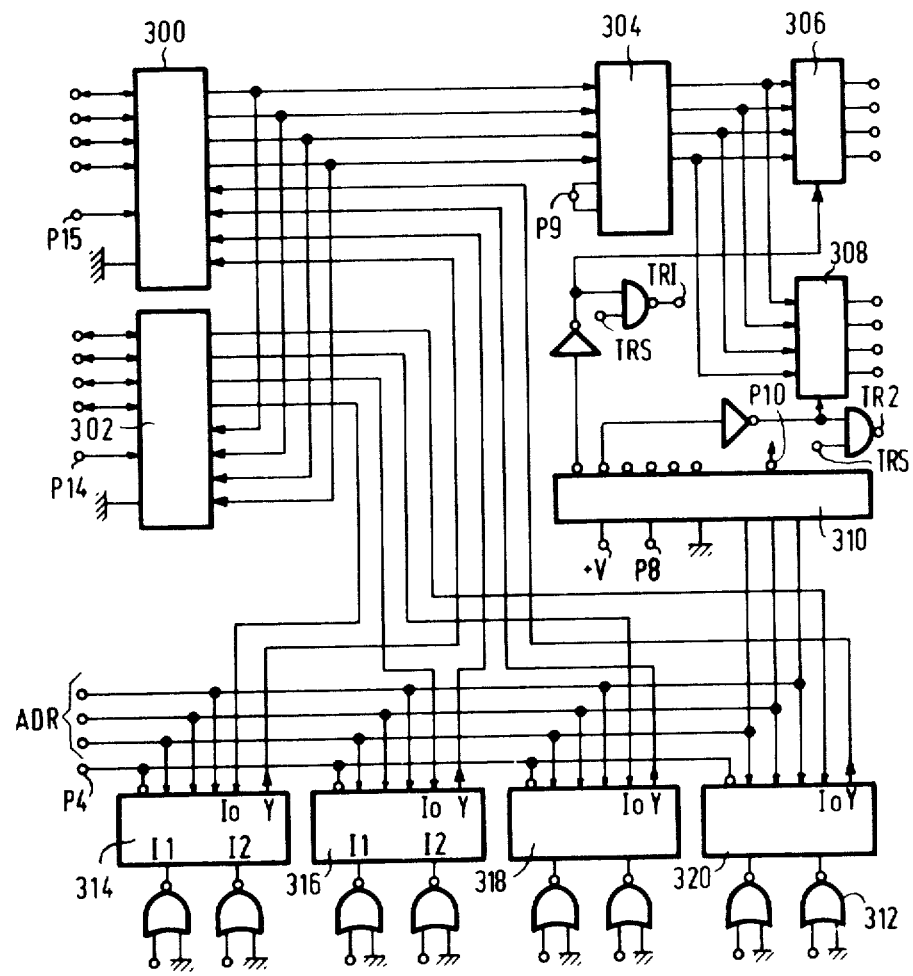
FIG. 6 shows a detailed diagram of a third part of the switching module which concerns the data signals.

The element 244 corresponds to the element 238. The clock input receives the signal of the local oscillator. The data inputs receive the signal DMS and the MR input receives the signal $+V$. The two outputs Q1, Q2 are combined in the NAND-gate 250. One input thereof is provided with a circle which symbolizes an inverter (74 LS 04) which is not shown. The circuit also comprises the following external connections:

ER: signal supplied by the microcomputer to enable the receive operation;

$\overline{BR}$: signal supplied by the microcomputer to indicate the end of a mass data transport for the relevant switching module;

P9: signalling to FIG. 6 to store a data byte from the auxiliary apparatus;

P10: signalling by the circuit of FIG. 5 that the signal $\overline{ES}$ is active for the address "0" which is the connection of the computer;

252: ditto as regards the signal $\overline{ER}$ of FIG. 5. If both $\overline{ES}$ and $\overline{ER}$ are active, the transparent connection between the computer and the auxiliary apparatus has been established. The signals $\overline{ER}$ and $\overline{ES}$ are supplied by the microcomputer.

P14, P15: signals which control the bidirectional drive devices 302 (for the data lines of the computer) and 300 (for the auxiliary apparatus), respectively.

FIG. 5 shows a detailed diagram of a second part of the switching module which concerns the synchronization signals, including the elements DRI2 (126), REC2 (128), CHSEL2 (134) and MUX2 (138) of FIG. 3. Block 254 represents a decoder/demultiplexer of the type 74 LS 138. The selection is realized by three address bits ADR received from the microcomputer. In this embodiment only six of the eight feasible codes are used, one for each of the six internal data highways of the switching device. Connection E3 (enable) is connected to the supply voltage and the inverting input E2 to ground. The inverting input E1 receives the signal $\overline{ER}$ in parallel with the circuit of FIG. 4. Consequently, the auxiliary apparatus of the relevant switching module can be activated as a data receiver. The data output "0"

of block 254 in FIG. 5 forms a connection to the input 252 in FIG. 4. The upper half and the lower half of FIG. 5 consist of corresponding parts. The data output "0" of block 255 is connected to input P10 in FIG. 4. The latter two data outputs set the switching module to the transparent mode of operation between the computer and the auxiliary apparatus. Each of the data outputs 1 to 6 of the blocks 254, 255 controls one of the six internal data highways of the switching device (always only one of the two is active: when the auxiliary apparatus acts as a transmitter, the signals TRS and DMS maintain the handshake; when the auxiliary apparatus acts as a data receiver, however, the signals TRR and DMR maintain the handshake). The data outputs "7" of the blocks 254, 255 are not used. The block 256 is a buffer/gate element. For each input it comprises a series-connected inverter and a NAND-gate. The six NAND-gates can be selectively made conductive for the time-dependent signal DMR by one of the output signals of the block 254. Similarly, the signal TRS can be selectively conducted in the block 263.

Block 261 is a data selector/multiplexer of the type 74 LS 151 (like block 260). The selection inputs S0, S1, S2 are connected parallel to the address bits of the block 254. The input E is parallel to the enable input E1 of the block 254. The data input Io is not used and is grounded. The data inputs I1 ... I6 receive the signals TR1 ... TR6 from the relevant internal data highways. The data output Y carries said signal $\overline{TRR}$.

The block 260 is connected in substantially the same way as the block 261. However, the enable signal E is derived from the signal ES (which also acts for the block element 255 and which is generated by the microcomputer on the connection P8). This signal enables a transmission operation for the auxiliary apparatus of the relevant switching module. The data inputs I1 to I6 receive the signals DM1 ... DM6 which originate from the block 256. The data output carries the signal $\overline{DMS}$ which can be applied to the block 244 in FIG. 4. Thus, either the block elements 254, 261 are activated (receiver position) or the block elements 255, 260 (transmitter position), or none of these blocks. The line outputs DM1 ... 6, TR1 ... 6 thus act in both directions.

FIG. 6 shows a detailed diagram of a third section of the switching module which concerns the data signals, notably the elements DRI1 (122, REC1 (124), CHSEL1 (132) and MUX 1 (136) in FIG. 3. For the sake of simplicity it has been assumed that the data path has a width of only four bits (instead of 8 bits) and that the switching device comprises only two parallel connected internal data highways (addressed by three address bits).

The elements 300, 302 form the interface elements for the auxiliary apparatus and the computer, respectively (four bits bidirectionally). These elements are quadruple line receivers/blockable line drivers of the type 8T38, make Signetics, Sunnyvale, Calif., USA. Driving is realized by the signals on P15 and P14, respectively. The data received by the element 300 can be stored in the latch circuit of the type 74 Ls 75 (block 304) under the control of the signal P9. The latch circuit is connected to two buffer circuits (quadruple output stage 74 LS 38), one buffer circuit being provided for each internal data highway (306, 308). The buffer circuits are activated by an element 310 of the type 74 LS 138, each time followed by an inverter. This element receives three address bits and the transmission enable signal $\overline{ES}$. Output line "0" carries the signal P10, and each of the output lines 1 ... 6 addresses one of the internal data highways. Connection of these output lines to a NAND-gate, together with the signal TRS, produces the signals TR1, TR2 ... cf. FIG. 5. Data is received from the internal data highways via 4×2 NOR-gates 312 of the type 8T 37; the other input is each time grounded. There are provided four selectors 314 ... 320 which receive the signal $\overline{ER}$ as the enable signal, and also the three-bit address for the internal data highway (or the address "0" for the computer). A further data bit can thus each time be received from the block element 302. The output data can be applied to the block element 300.

Figure 7:
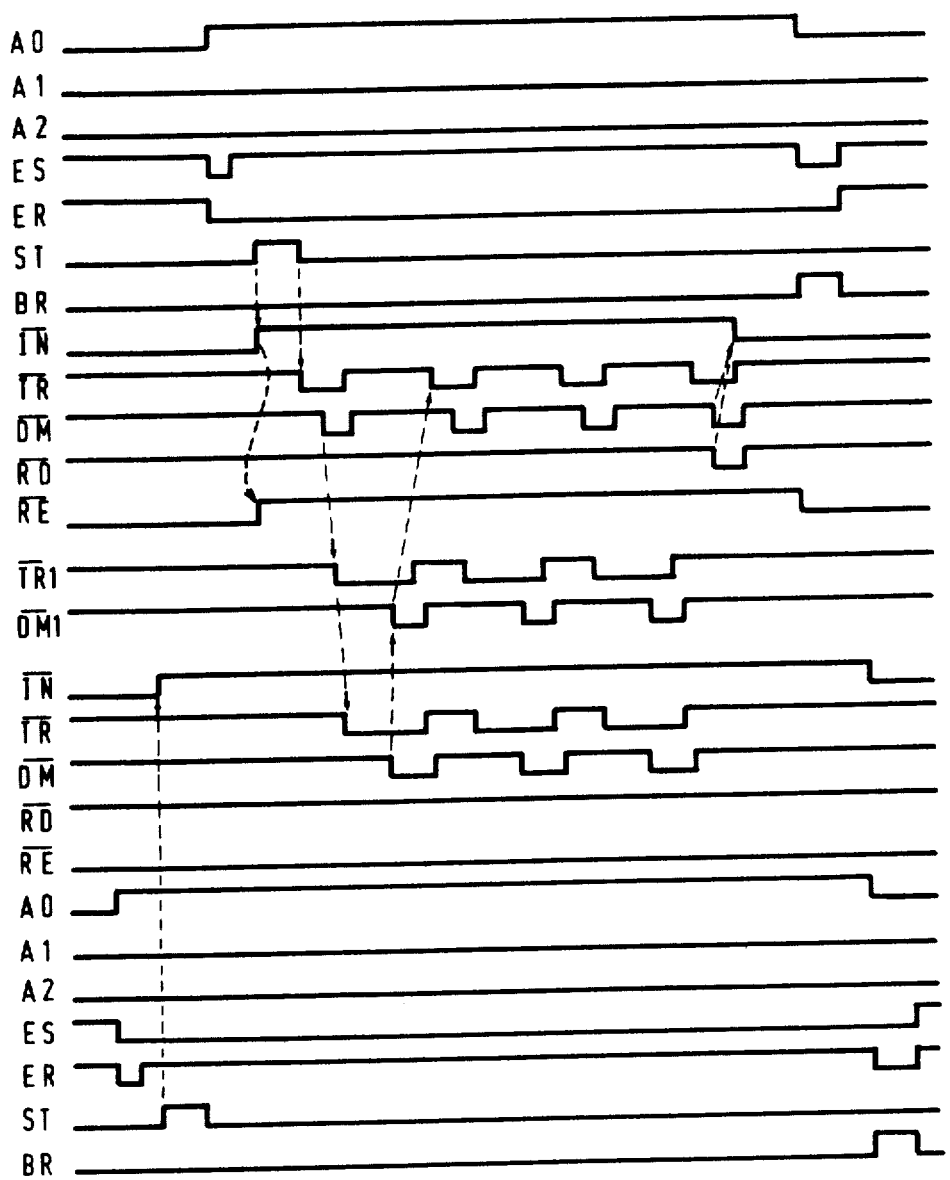
FIG. 7 shows a time diagram of a number of signals in the switching module.

FIG. 7 shows a time diagram of a number of signals in a switching module: a mass data transport is initiated between two auxiliary apparatus. The upper twelve signals concern the transmitting auxiliary apparatus, and the lower twelve signals concern the receiving auxiliary apparatus. The signals ER, ES, A0, A1, A2, ST and BR thereof are supplied by the microcomputer. The remaining two signals concern the synchronization handshake on the internal data highway during the mass data transport. Each of the two auxiliary apparatus comprises its own switching module. At the bottom left, first the initial modifications for the receiving auxiliary apparatus are activated. ES and ER become low. Previously, they were high at the address 0 (A0=A1=A2 low), so that the computer was addressed. The address is adjusted and ER becomes active again. Subsequently, the start signal is formed to activate the flipflop 236 in FIG. 4, the active state thereof being signalled back (signal $\overline{ACT}$) to the microcomputer. Moreover, the signal $\overline{IN}$ becomes high for the auxiliary apparatus, so that this apparatus is addressed. Subsequently (at the top left in the figure), the transmitting auxiliary apparatus is addressed in the same way by means of the same address for the internal data highway. The signals $\overline{IN}$ as well as $\overline{RE}$ then become high. At the end of the signal ST, the signal $\overline{TR}$ becomes active via the flipflop 240 in FIG. 4 whereby the handshake is started as indicated by the arrows. In this example, a series of three data bytes is transported. At the end of the transport, the transmitting auxiliary apparatus forms an active signal $\overline{RD}$. First the transmitting auxiliary apparatus is then deactivated and subsequently also the receiving auxiliary apparatus.

Per byte the following sequence is performed for the transmitting switching module:

(1) the flipflop 240 first signals that a byte may be transported;

(2) subsequently, the auxiliary apparatus informs the switching module, by way of a signal $\overline{DM}$, that a byte may be despatched;

(3) this byte of information is presented to the internal data highway and, moreover, the flipflop 240 is reset;

(4) the internal data highway returns a signal of the synchronization handshake (DM1, the 1 indicating the number of the internal data highway) and flipflop 240 is activated again. Subsequently the cycle can be repeated.

For the receiving auxiliary apparatus, the signal $\overline{TRR}$ directly proceeds to the auxiliary apparatus via the gate 248 and the selector switch 230. The signal $\overline{DM}$ is returned directly (shift register 238 introduces only a small delay), the positions of the flipflops remaining unchanged.

The interaction between the computer 52 and the switching device 40 is as follows:

A message from the computer to the switching device consists of three bytes of 8 bits each. The first byte is the control byte and may have the following values:

COAC (hexadecimal 39): activate the switching modules of a next pair of auxiliary apparatus;

COBR (hexadecimal 56): deactivate the switching modules of a next pair of auxiliary apparatus;

COBA (hexadecimal 65): deactivate the switching modules of all auxiliary apparatus.

The second and the third byte indicate the transmitting and the receiving apparatus, respectively; in the case of COBA, these bytes are without significance. A message from the switching device to the computer consists of two bytes.

UNID (hexadecimal 32): received message not recognized;

INAG (hexadecimal 33): reply after execution of message COBA;

MAX6 (hexadecimal 36): reply after message COAC if no internal data highway is available;

WRSE (hexadecimal 37): reply after COAC if requested transmitter is not available;

WRRE (hexadecimal 38): ditto if the receiver is not available;

SAME (hexadecimal 39): ditto if transmitter and receiver are the same.

In all these cases, the second byte has no significance. On the other hand, the two-byte message may also be:

(HEX. 6x-6y): a reply after the execution of the message COAC, x and y being the numbers of the two relevant auxiliary apparatus; the value range of these numbers extends from 0000-1111 in the present embodiment.

(HEX. 7x-7y): a reply after the execution of the message COBR, or a reply concerning the deactivated condition of the relevant two auxiliary apparatus, for example, when the data transport has already been terminated by one of these auxiliary stations.

Figure 8:
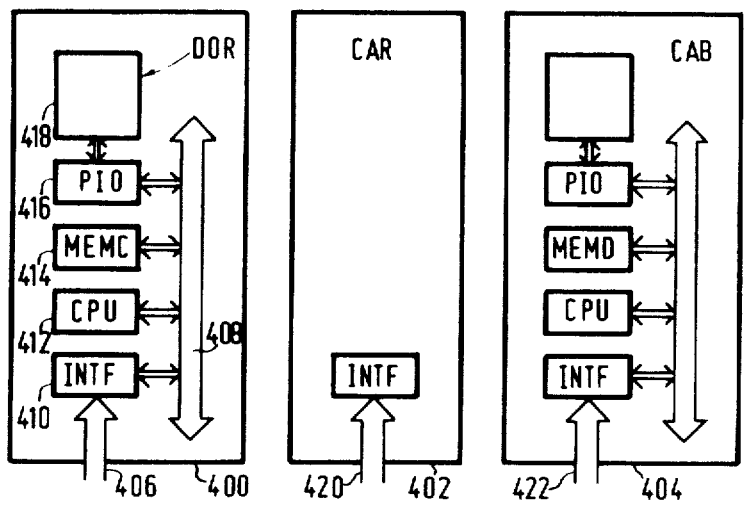
FIG. 8 shows details of the set-up of an auxiliary apparatus.

FIG. 8 shows some further details of the set-up of an auxiliary apparatus. Three blocks are shown. Block 400 represents, partly symbolically, the general set-up of an auxiliary apparatus. Arrow 406 represents the connection to the switching device: 8-bit data path +7 control lines for the signals $\overline{IN}$, $\overline{TR}$, $\overline{DM}$, $\overline{RD}$, $\overline{RE}$, $\overline{CM}$, $\overline{CL}$. Block 410 represents an interface element between the latter connection and the internal data highway of the auxiliary apparatus. Block 412 represents internal data processor means, such as a microprocessor. Block 414 represents a random access read/write memory. Block 416 is an interface unit between the data but 408 and the actual functions of the auxiliary apparatus in block 418. These functions mainly concern electromechanical transducers such as actuators and detectors, for example, for control signals for addressing the track of a disc memory and detection signals which indicate that the relevant track has indeed been reached. The microprocessor may be, for example, a Signetics 2650 or a Zilog Z80, and the modules 410, 414, 416 may be standard components which are compatible therewith. The data flow from the auxiliary apparatus can also take place via the data bus and the connection 406. Thus, a variety of conventional auxiliary apparatus such as word processors can be constructed.

FIG. 8, however, notably shows the organization of an auxiliary apparatus on the basis of a video disc for digital optical recording (D.O.R.). The control/detection function in block 418 then concerns:

gripping of a video disc present in a loading position;

positioning of the video disc on the stationary spindle;

acceleration of the spindle to the correct number of revolutions;

addressing of the desired track;

focusing of the write and/or read means onto this track and following of the track;

selecting between reading, writing and the non-active position;

correct modulation during writing or demodulation during reading of the signals;

buffering of a data sector and interleaving of information in order to mitigate the effect of an error burst;

returning (with stationary spindle) of the video disc to the loading position.

Furthermore, in block 400 it is detected whether the correct sector position has been addressed (sector selection according to section number) and whether this position contains permissible information (for a read operation) or is empty (in the case of a write operation). The block 400 is symbolized in FIG. 1 by the blocks 32, 34, each of which may comprise such a control unit.

The blocks 402, 404 are represented together in FIG. 1 by the block 76. This block concerns the part of the control system of a video disc memory which is activated before the disc can be addressed by the elements in the block 400. The blocks 402, 404 have a similar content as the block 400; however, this is shown in detail only for block 404. Obviously, the quantity of the content varies as the complexity of the control to be executed varies. For example, in given cases control has to be provided by a number of microprocessors. Block 404 controls a storage module for 64 video discs in order to present a video disc addressed by the computer from a storage position to a transfer position. Moreover, a video disc presented to a second input transfer position can be transported to the former output transfer position.

The control unit can thus perform inter alia the following functions:

receiving a storage address detecting absence/presence of a video disc at the relevant address and signalling conflicts; for example, the desired positioning of a video disc in an occupied position;

solving priority problems: for as long as a video disc is on its way from an operational position to the storage position, it may not be encountered by a next video disc travelling in the opposite direction;

controlling a number of partial motions of a gripping mechanism for the video disc;

detecting the actual positions of gripping mechanism and video disc.

The storage modules can be linked by making the output transfer position of a storage module coincide with the input transfer position of a next module.

Similarly, the block element 402 controls a transport module. Such a module comprises one (or possibly more) input positions which coincide with the output transfer position of a storage module. Furthermore it comprises one or more loading positions which coincide with a corresponding loading position of the actual auxiliary apparatus (block 400). A modular construction of the device is thus also possible.

As is shown in FIG. 1 (block 76), the block elements 402, 404 form direct peripheral apparatus of the computer. Without the switching device being loaded thereby, a video disc can thus be transported to the operational position or to the storage position. This results in a more flexible organization.

What is claimed is:

1. An office system for the processing of a data file by means of at least two simultaneously operational terminals (VDU1, VDU2), common processor means (CPU), a first number of peripheral apparatus (74, 78), and a data bus (67) which interconnects the processor means, the terminals and peripheral apparatus, characterized in that for the updating of a document file and the mass data transport between a second number of auxiliary apparatus including,

- a document reader (20) with pixel-wise scanning of a document field according to a scan pattern;
- a read/write memory (26) for the reversible storage of the total pixel information of said document filed in accordance with said scan pattern;
- a display device (28) for the display of the total pixel information of said document field;
- a memory device (32) comprising a digital video disc with optical write and read means for the filing of the total pixel information of said document field;
- a switching device (40) is provided which comprises:
- a switching module (106) for each of said auxiliary apparatus which comprises a first connection (108) for the relevant auxiliary apparatus, the second connection (110) to said data bus, a third connection (116) and a control connection (112), the first and the second connection being transparently interconnected in a first state of the switching module, while the first and the third connection are interconnected in a second state of the switching module;
- at least one first (42) and one second (44) internal data highway whereto all said third connections are coupled;
- a control member (50) which comprises a first control line (100) which is connected to the data bus in order to receive control and selection signals and to dispatch reply signals and which also comprises associated control outputs (114) which are connected to the control connections of associated switching modules in order to carry a selection signal for activating said first or said second state as desired, and in order to form in said second state two coexistent pairs from four of said second number of auxiliary apparatus, said pairs being interconnected via said first and said second internal data highway, respectively, said control member furthermore comprising a signalling input for receiving a termination signal after termination of a mass data transport and for releasing the relevant data highway in reaction thereto;
- a data flow control element (174) for realizing a mass data transport of the pixel information of a document field in said second position of the switching module, synchronized in a handshake by synchronization signals which are also carried on the internal data highway.

2. An office system as claimed in claim 1 for use with a third number of n internal data highways, wherein the third connection in each switching module comprises n lines, each of which is coupled to a respective internal data highway, each switching module having n second states for performing a 1-out-of-n selection from said n lines.

3. An office system as claimed in claim 1 or 2, wherein for the memory device (32) comprising a digital video disc there is provided a disc storage device having k separate disc storage positions and a common disc loading position for the memory device and the storage device, there being provided a selection/transport device for transporting a selectable video disc between the associated storage position and the loading position, said storage device comprising a second control member which is connected to said data bus as a further peripheral apparatus (76).

4. An office machine system as claimed in any one of claims 1, 2 or 3, wherein a first and a second, correspondingly constructed switching device are present, the first connection of each time a first switching module in one of the switching devices being connected to the second connection of a second switching module in the other switching device, the second connection of the first switching module being connected to the data bus and the first connection of the second switching module being connected to the associated auxiliary apparatus.

* * * * *